United States Patent
Brodesser et al.

(10) Patent No.: US 6,581,561 B1
(45) Date of Patent: Jun. 24, 2003

(54) SUCTION SYSTEM FOR AN INTERNAL COMBUSTION ENGINE

(75) Inventors: Kay Brodesser, Rutesheim (DE); Hans-Peter Drespling, Heidenheim (DE); Hans Jensen, Kirchheim (DE); Günter Kachler, Ingersheim (DE); Horst Schneider, Waiblingen (DE); Jürgen Stehlig, Neckartailfingen (DE)

(73) Assignee: Mahle Filtersysteme GmbH, Stuttgart (DE)

( * ) Notice: Subject to any disclaimer, the term of this patent is extended or adjusted under 35 U.S.C. 154(b) by 0 days.

(21) Appl. No.: 09/914,972
(22) PCT Filed: Mar. 2, 2000
(86) PCT No.: PCT/DE00/00585
§ 371 (c)(1),
(2), (4) Date: Dec. 14, 2001
(87) PCT Pub. No.: WO00/53919
PCT Pub. Date: Sep. 14, 2000

(30) Foreign Application Priority Data

Mar. 8, 1999 (DE) .......................... 199 09 850

(51) Int. Cl.⁷ .............................................. F02M 35/10
(52) U.S. Cl. ............................. 123/184.34; 123/184.61
(58) Field of Search .......................... 123/184.34, 184.61

(56) References Cited

U.S. PATENT DOCUMENTS

| | | | |
|---|---|---|---|
| 4,643,137 A | * 2/1987 | Choushi et al. | 123/184.34 |
| 4,829,944 A | * 5/1989 | Sukimoto et al. | 123/184.61 |
| 5,357,931 A | * 10/1994 | Semence | 123/184.61 |
| 5,651,338 A | * 7/1997 | Pacheco et al. | 123/184.34 |
| 5,832,890 A | * 11/1998 | Ikeya et al. | 123/184.34 |
| 5,970,939 A | * 10/1999 | Motosugi et al. | 123/184.61 |
| 6,357,411 B1 | * 3/2002 | Aoki | 123/184.34 |

FOREIGN PATENT DOCUMENTS

| | | |
|---|---|---|
| DE | 4303032 | 8/1993 |
| DE | 4216255 | 11/1993 |
| DE | 19636579 | 3/1997 |
| DE | 19647184 | 5/1998 |
| EP | 0155685 | 9/1985 |
| EP | 0567702 A1 | 11/1993 |
| EP | 0567702 B1 | 6/1997 |
| EP | 0984155 | 3/2000 |
| EP | 0984156 | 3/2000 |

* cited by examiner

Primary Examiner—Marguerite McMahon
Assistant Examiner—Jason Benton
(74) Attorney, Agent, or Firm—Collard & Roe, P.C.

(57) ABSTRACT

The invention describes a plastic embodiment for a suction system, whereby various configurations of said embodiment can be produced at low cost. According to the invention, a modular structured suction system is created. Said system comprises a plastic air distributor module which can be connected to an air feed pertaining to an internal combustion engine; several plastic, single-pieced suction pipe modules, whereby one end of the suction pipes is joined to the air distributor module and the suction pipes are respectively allocated to a combustion chamber of the internal combustion engine; in addition to at least one plastic single-pieced flange module that is connected to the other end of the suction pipe of at least one suction pipe module and which can be secured to the internal combustion engine.

16 Claims, 3 Drawing Sheets

SUCTION SYSTEM FOR AN INTERNAL COMBUSTION ENGINE

CROSS REFERENCE TO RELATED APPLICATIONS

Figure 1:
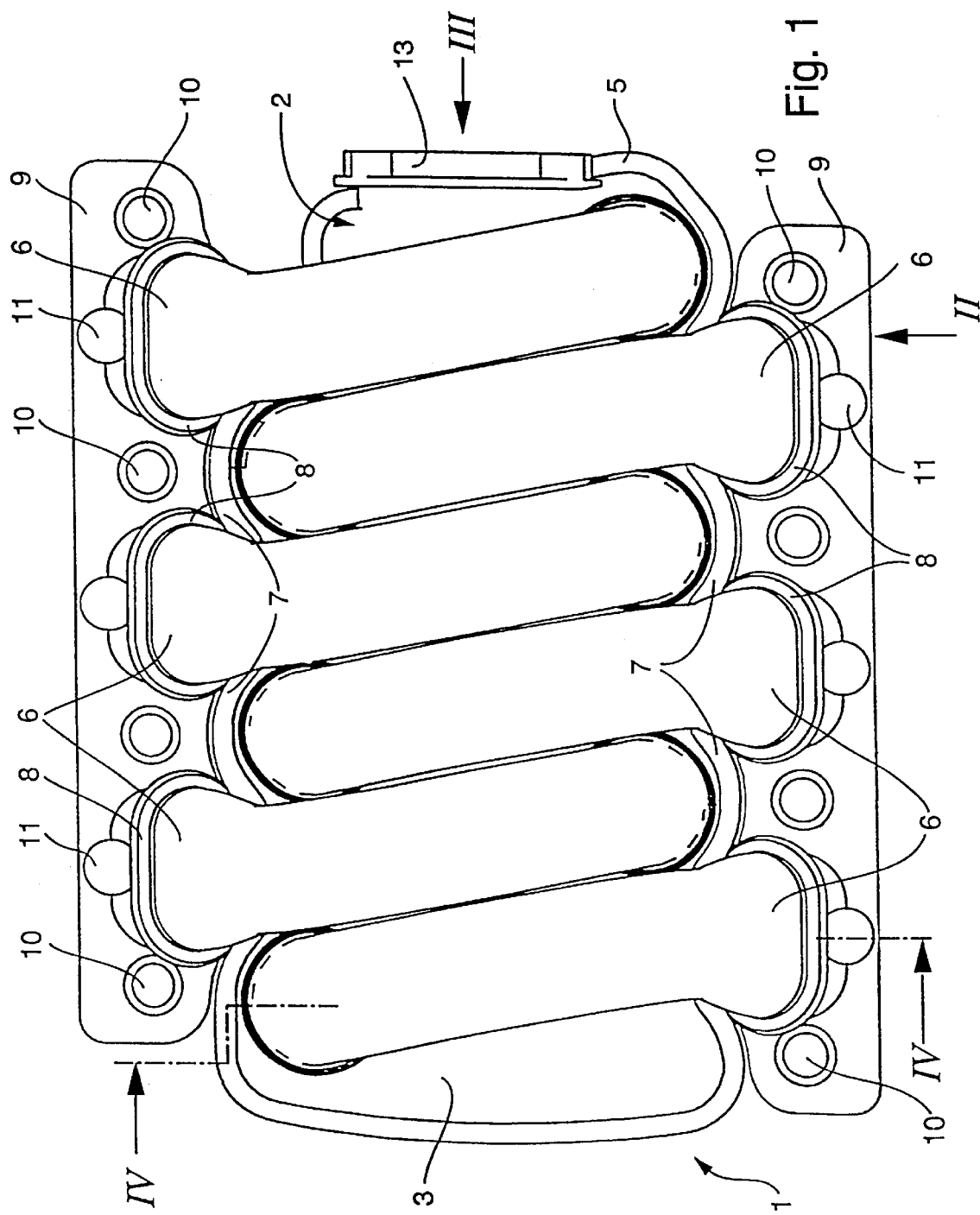

Applicant claims priority under 35 U.S.C. §119 of German Application No. 199 09 850.6, filed on Mar. 8, 1999. Applicant also claims priority under 35 U.S.C. §120 of PCT/DE00/00585, filed on Mar. 2, 2000. The international application under PCT article 21(2) was not published in English.

This invention relates to a suction system or an intake system made of plastic which, in the case of an internal combustion engine, distributes to the individual combustion chambers of the combustion engine the combustion air which is provided through an air supply for combustion in the internal combustion engine. This invention also relates to a method of producing such an intake system.

Such an intake system usually has an air distributor which is connected to the aforementioned air supply of the internal combustion engine and in which the air supplied is collected and distributed among individual intake manifolds. These intake manifolds open at one end into the air distributor and at the other end are connected to the respective combustion chamber of the internal combustion engine. Preferably a flange which is connected to the respective intake manifolds is provided for connection of the intake manifolds to the combustion chambers and to the engine block of the internal combustion engine.

German Patent 42 16 255 A1 describes an intake system of the type defined in the preamble, its air distributor being designed in one piece with the intake, manifolds and produced by the blow-molding technology. European Patent 0 567 702 B1 also describes such an intake system whose air distributor is designed in one piece with the intake manifolds and is manufactured by the blow-molding technique, with a flange being integrally, molded on the intake manifolds.

European Patent 0 155 685 A2 discloses an intake system whose air distributor is connected via intake manifolds to flanges which are in turn mounted in cylinder blocks of an internal combustion engine. The intake manifolds are assigned in two parts, each consisting of an upper pipe section, which is bent in a U shape and is connected to the air distributor at the side, plus an essentially unbent extension section which is connected to the respective flange. The intake manifolds are guided in such a way that adjacent intake manifolds intersect beneath the air distributor.

European Patent 0 984 155 A2 and European Patent 0 984 156 A2 a disclose intake systems in which the intake manifolds are each composed of two complementary halves.

In a modern internal combustion engine, such an intake system is made of plastic, especially for reasons of weight. Because of the curved shape of the intake manifolds, however, it is relatively complicated to manufacture such an intake system. For example, a known intake system is formed from two complementary half-parts, each being manufactured by an injection-molding method and having a complicated mold. Each half-part has one half-shell component of the intake manifolds. An intake manifold is completed only by joining the two half-parts together. A welding method, in particular a friction welding method is used to join the two half-parts, with welding collars that run completely around the half-parts and around each intake manifold half-shell being joined together. With an intake system designed in this way, a minimum distance is necessary between adjacent intake manifolds because of the welding collar in order to be able to perform the welding method for joining the half-parts. Therefore, the known intake system cannot be used for an internal combustion engine with an especially compact design.

With another intake system, at least one complex section which entirely encompasses the intake manifolds is produced in one piece as an injection-molded part with the help of a core melting method. Due to the absence of a welding collar, this intake system can be designed so that it is also suitable for use in a relatively compact internal combustion engine. However, injection molding by the core melting method is cost intensive.

In addition, the known plastic intake systems also have the disadvantage that any minor change in the design of the intake system to adapt it to installation conditions, engine types or the like is always associated with high tools costs, because injection-molded parts with a complex shape require complicated and therefore expensive tools and dies.

The present invention addresses the problem of providing an embodiment that can be adapted relatively inexpensively to different installation situations, engine types or the like for an intake system of the type defined in the preamble.

This problem is solved according to this invention by an intake system having the features of claim 1.

This invention is based on the general idea of designing the individual components of the intake system—at least the air distributors, the intake manifolds and the flange—each as one-piece modules which can be joined together in the manner of a modular system to form any desired configurations of the intake system. In particular, different intake manifold modules, air distributor modules and flange modules may be provided and produced, with the respective connection sites or interfaces being standardized to such an extent that the different modules can be combined with one another in a variety of ways.

The flexibility of an intake system designed in this way is obvious, because for changes involving only one component of the intake system, only the manufacturing costs associated with it, in particular the tool costs, need be expended, because the other components of the intake system can still be used without any change. Secondly, this also yields the possibility of manufacturing intake systems with different configurations in parallel. For example, the same intake manifold modules can be used for a 4-cylinder engine and also for an 8-cylinder engine. With a traditional intake system, manufacturing costs are usually doubled to produce two different embodiments, but with the intake system according to this invention, the cost of manufacturing different variants is much lower. This also yields greater flexibility for the design of the internal combustion engine equipped with these parts.

According to a preferred embodiment, each intake manifold module may be designed as a blow-molded part, i.e., the intake manifold module is then a component manufactured by a blow-molding method. To allow the intake manifold module to be manufactured as a blow-molded part, it must be made of a plastic having a suitable viscosity. An intake manifold module designed as a blow-molded part has an especially high-quality interior surface, so that flow through the intake manifold module can be optimized. In addition, a blow-molding method can be varied in an especially inexpensive manner to design different shapes of the blow-molded part produced by it. Accordingly, production of different variants of the intake manifold module and thus the intake system itself is relatively inexpensive.

According to an especially advantageous embodiment, each flange module may be designed as an injection-molded part, i.e., the flange module is a component manufactured by an injection-molding process, this flange module being designed by integral injection-molding on the respective intake manifold modules, so the respective end of the pipe of the respective intake manifold module is shaped to yield a form-fitting connection between the intake manifold module and the flange module. Such a form-fitting connection is achieved in particular by the fact that the cross section of the pipe expands in the direction of extent, with the integrally molded material of the flange surrounding this widened portion of the cross section and embedding it. Through the measure according to this invention, the flange module is connected to the respective intake manifold modules during its manufacture, so that no additional assembly steps are necessary.

In another embodiment which is adapted to an internal combustion engine having two cylinder blocks, especially a V6 or V8 engine, two flange modules may be provided, each assigned to one cylinder block of the internal combustion engine, with the intake manifold modules arranged side-by-side and connected to one flange module and to the other flange module in alternation. In particular, each flange module may extend along one side of the air distributor module and in parallel with it, with the respective intake manifold modules connected to it in an area of the air distributor module facing away from this side. Therefore, in the case of two flange modules, this yields a constellation in which the flange modules extend along opposite sides of the air distributor module, and the intake manifold modules assigned to one flange module run between the flange modules next to the intake manifold modules assigned to the other flange module. Each of these embodiments permits an especially compact design which can be achieved especially easily through the intake system according to this invention.

The flexibility of the intake system according to this invention can be increased by also designing the air distributor module by a modular design so that it consists of a one-piece air distributor top part module and a one-piece air distributor bottom part module, with the intake manifold modules preferably being connected to the air distributor top part module.

The problem on which this invention is based is also solved by a method according to claim 11. One particular advantage of this method is regarded as the fact that deviations in shape and position of the modules due to tolerance and shrinkage processes can be corrected with each integral molding or bonding of another module, so that finally the intake system according to this invention can maintain a relatively narrow tolerance.

Additional important features and advantages of the intake system according to this invention are derived from the subordinate claims, the drawings and the respective description of figures on the basis of the drawings.

It is self-evident that the features mentioned above and to be explained below can be used not only in: the combination indicated but also in any other combinations or they may also be used alone without going beyond the scope of the present invention.

A preferred embodiment of this invention is illustrated in the drawings and is described in greater detail in the following description.

Figure 2:
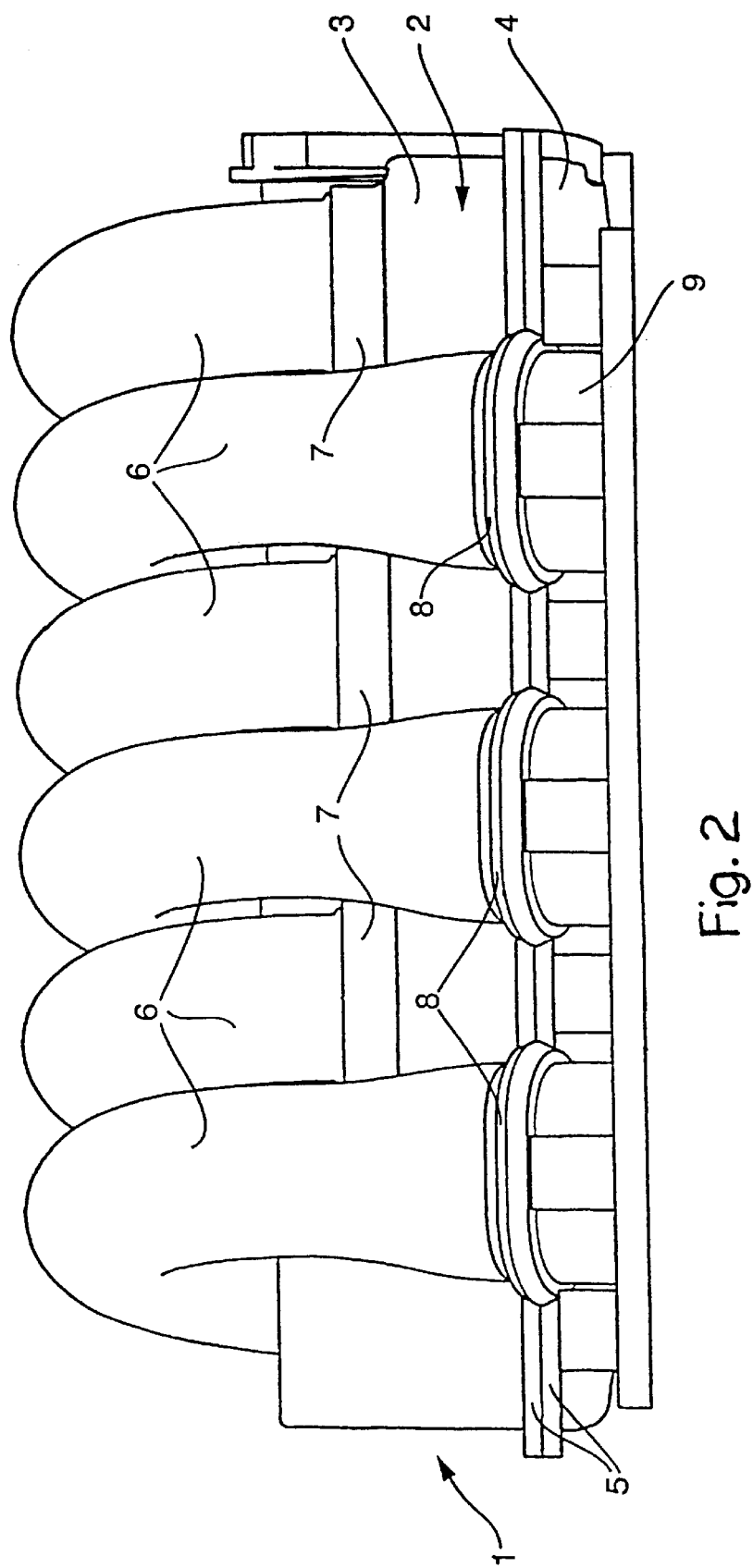
Figure 3:
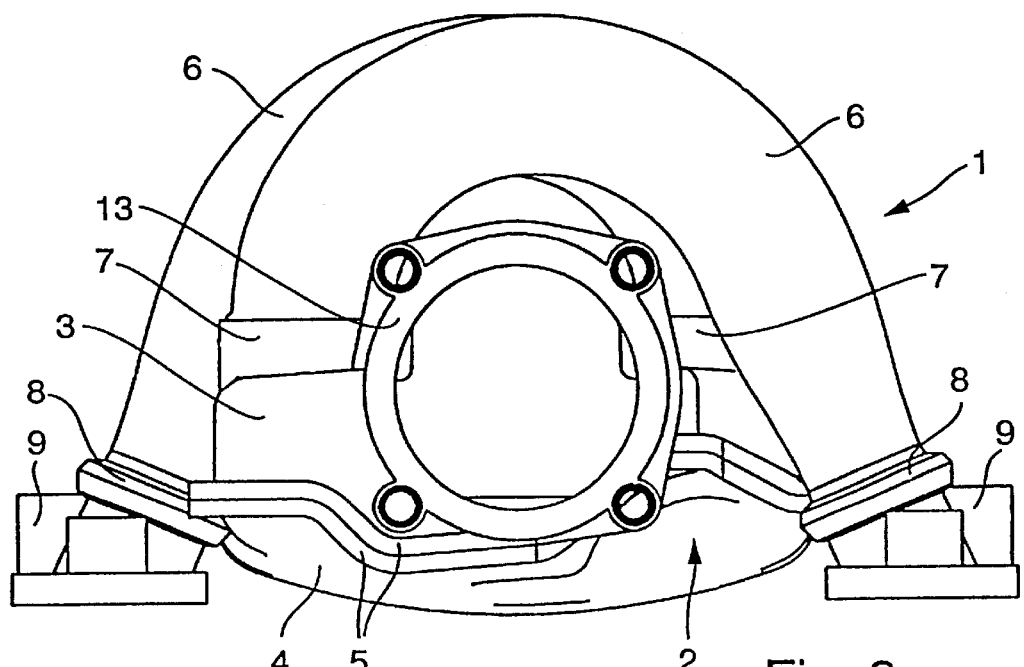

The drawings show schematically:

FIG. 1: a top view of an intake system according to this invention,

FIG. 2: a side view of the intake system according to arrow II in FIG. 1,

FIG. 3: a front view of the intake system according to arrow III in FIG. 1 and

Figure 4:
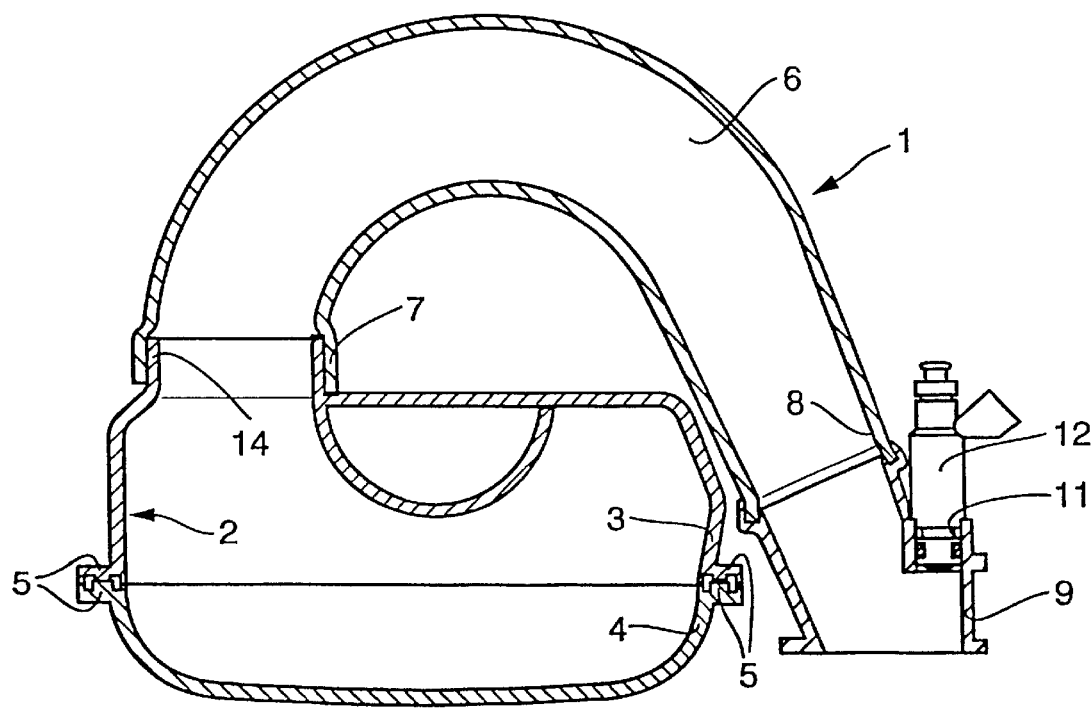

FIG. 4: a sectional view through the intake system according to sectional line IV in FIG. 1, with the components of the intake system that are arranged behind the plane of the cross section in the direction of viewing being omitted to simplify the illustration.

According to FIGS. 1 through 4, an intake system 1 according to this invention has an air distributor module 2 with a modular design, consisting of an upper one-piece air distributor top part module 3 according to FIGS. 2, 3 and 4 and a lower one-piece air distributor bottom part module 4 according to FIGS. 2, 3 and 4. The air distributor top part module 3 and air distributor bottom part module 4 each have a collar or flange 5 which projects outward and runs completely around the part, with the two modules 3 and 4 being joined together at this collar.

Several (six in the present case) one-piece section pipe modules 6 are connected to the top side of the air distributor top part module 3 or they are connected to the air distributor top part module 3 and thus to the air distributor module 2. Each of these intake manifold modules 6 is assigned to a cylinder of an internal combustion engine (not shown) and is used to supply air to the respective combustion chamber. Although the air distributor modules 6 are connected to the air distributor module 2 at one pipe end 7, at the other pipe end 8 they are connected to a flange module 9 which can be mounted on the internal combustion engine. For this purpose, the flange module 9 has suitable mounting holes 10.

In the embodiment illustrated in the figures, the intake system 1 is configured for a V6 engine, so the two flange modules 9 are provided accordingly. Flange modules 9 each extend along one side of the air distributor module 2. The six intake manifold modules 6 are arranged side-by-side and are connected alternately to one or the other flange module 9. In addition, the intake manifold modules 6 of each flange module 9 are each connected to the air distributor module 2 in an area of the air distributor module 2 which faces the other flange module 9, so that adjacent intake manifold modules 6 run parallel to and alongside one another above the air distributor module 2. As indicated in FIGS. 1 through 3, this yields an especially compact design for the intake system 1 according to this invention.

Receptacles 11 in which an injection valve 12 can be mounted as indicated in FIG. 4 are provided in the flange modules 9.

The air distributor top part module 3 is also equipped with a connection 13 on a front side of the intake system 1 for connecting the intake system 1 to an air intake of the internal combustion engine. The air supplied through this air intake of the intake system 1 first penetrates into the air distributor module 2, is collected there and is then distributed to the individual intake manifold modules 6 from which the air supplied finally reaches the combustion chambers of the internal combustion engine.

Intake system 1 according to this invention is manufactured as described below.

First, the intake manifold modules 6 are produced by a suitable manufacturing method such as a blow-molding method or an injection-molding method. Due to the fact that they are manufactured as separate modules, it is relatively easy to vary the shape of the intake manifold modules 6; for example, the pipe diameter, the radius of curvature and the pipe length can be adapted to different configurations of the internal combustion engine in this way. In parallel with the production of the intake manifold modules 6, the air distributor top part module 3 and the air distributor bottom part module 4 can be manufactured separately, e.g., by a traditional injection-molding method.

The intake manifold modules 6, each assigned to one flange module 9, are then inserted into an injection mold at least at their pipe ends 8, and they are aligned if necessary. Following that, an injection-molding process can take place, wherein the respective flange module 9 is formed. Then the pipe end 8 of the intake manifold module 6 assigned to the respective flange 9 is designed so that it is encased by the material of the flange module 9 on both sides in the injection-molding process, i.e., on the inside and outside with respect to the intake manifold module 6. In addition, the wall thickness of the intake manifold module 6 is widened in this pipe end 8, thus creating on the whole a highly effective method of anchoring the intake manifold module 6 in the flange module 9. The pipe end 8 is thus connected to the flange module 9 at least in a form-fitting manner. In order for the connection between the intake manifold module 6 and the flange module 9 to be of a high quality, strong and tight and designed for a long lifetime, the flange module 9 is mounted on the intake manifold modules 6 by means of a special method so as to form a bonded connection in which the plastics of the two modules 6 and 9 are fused together in the manner of a welding operation in the area of the connection. The plastics are selected to be compatible accordingly.

Following this, the other pipe ends 7 of the intake manifold modules 6 are connected to the air distributor top part module 3, for which purpose the connection of the intake manifold module 6 to the air distributor module 2 is designed here as a plug connection. The pipe end 7 assigned to air distributor module 2 is then designed as an outside connection, and the air distributor top part module 3 has an inside connection 14. Connections 7 and 14 which are joined together in this way can then be connected, preferably using a welding method, to form the most intimate possible connection, preferably a bonded connection or a chemical connection, between the intake manifold module 6 and the air distributor module 2. Likewise, an adhesive bond, a shrink-fit connection or a combination of different joining techniques may be used. Before or during the attachment of the air distributor module 2 to the intake pipe module 6, the components of the intake system may optionally be aligned.

Finally, the air distributor bottom part module 4 may be joined to the air distributor top part module 3 by using a traditional friction welding method. It is obvious that the connection of the two modules 3 and 4 of the air distributor module 2 can already be performed in advance here, so that the complete air distributor module 2 is then joined to the intake manifold modules 6 accordingly.

What is claimed is:

1. An intake system with a modular design for an internal combustion engine comprising:

a) a modular plastic air distributor module which comprises a one-piece air distributor top part module and a one piece air distributor bottom part module which can be coupled to an internal combustion engine;

b) a plurality of one piece plastic intake manifold modules each being formed separate from said modular plastic air distributor module, each of said plurality of one piece plastic intake manifold modules having a first pipe end and a second end wherein said first pipe end is coupled to said top part module of said modular plastic air distributor module and each being assigned to one combustion chamber of the internal combustion engine; and c) at least one plastic flange module coupled to said second end of at least one of said plurality of one piece plastic intake manifold modules, wherein said at least one plastic flange module can be mounted on the internal combustion engine.

2. An intake system with a modular design for an internal combustion engine comprising:

a) a plastic air distributor module which comprises a one-piece air distributor top part module and a one piece air distributor bottom part module which can be coupled to the intake system of an internal combustion engine;

b) a plurality of one piece plastic intake manifold modules each being formed separate from said plastic air distributor module, said manifold modules having a first pipe end and a second end wherein said first pipe end is coupled to said plastic air distributor module and each being assigned to one combustion chamber of the internal combustion engine; and c) at least two plastic flange modules coupled to at least one of said intake manifold modules at said second end, wherein said at least two plastic flange modules can be mounted on the internal combustion engine and are each assigned to one cylinder block of the internal combustion engine, wherein said plurality of one piece plastic intake manifold modules which are arranged side by side, are connected to one of said at least two plastic flange modules and then to another of said at least two plastic flange modules in an alternating manner.

3. The intake system as in claim 1 wherein said modular plastic air distributor module, said plurality of one piece plastic intake manifold modules and said at least one plastic flange module are all made from polyamide plastic.

4. The intake system as in claim 1 wherein said modular plastic air distributor module, said plurality of one piece plastic intake manifold modules and said at least one plastic flange module are all made from a glass fiber reinforce plastic.

5. The intake system as in claim 1, wherein said modular plastic air distributor module said plurality of one piece plastic intake manifold modules and said at least one plastic flange module are all made from a carbon reinforced plastic.

6. A method of producing an intake system according to claim 1, wherein said plurality of one piece plastic intake manifold modules are produced by a blow-molding method; said pipe ends assigned to said at least one plastic flange module are introduced into an injection mold; wherein said at least one plastic flange module is produced by an injection-molding method wherein said pipe ends which are introduced into the injection mold are embedded in the material of said at least one plastic flange module, and the pipe ends assigned to the modular plastic air distributor module are connected to the modular plastic air distributor module.

7. An intake system according to claim 2, wherein said at least one plastic flange module extends along one side of the modular plastic air distributor module and in parallel with it, and at least one of said plurality of one piece plastic intake manifold modules is connected to an area of said modular plastic air distributor module that faces away from this side.

8. An intake system according to claim 2, wherein said plurality of one piece plastic intake manifold modules are each connected to a top end of said modular plastic air distributor module.

9. An intake system according to claim 1, wherein each of said plurality of one piece plastic intake manifold modules is joined to said modular plastic air distributor module by a welding method.

10. An intake system according to claim 1, wherein said plurality of one piece plastic intake manifold modules are each connected to a top end of said modular plastic air distributor module.

11. An intake system according to claim 1, wherein each of said plurality of one piece plastic intake manifold modules is designed as a blow-molded part.

12. An intake system according to claim 1, wherein each of said plurality of one piece plastic intake manifold modules is designed as an injection-molded part.

13. An intake system according to claim 12, wherein the injection-molding method used to produce the plurality of one piece plastic intake manifold modules works with a rotary slide technique or with a half-shell technique.

14. An intake system according to claim 1, wherein each of said at least one plastic flange module, is designed as an injection-molded part, which is integrally molded onto at least one of said plurality of one piece plastic intake manifold modules, where the respective pipe end of said plurality, of one piece plastic intake manifold modules is shaped in such a way that a form-fitting connection is created between said plurality of one piece plastic intake manifold modules and said at least one plastic flange module.

15. An intake system according to claim 1, wherein said at least one plastic flange module comprises a first flange module and a second flange module each being assigned to one cylinder block of the internal combustion engine, with said plurality of one piece plastic intake manifold modules which are arranged side-by-side being connected to said first flange module and to said second flange module in an alternating manner.

16. An intake system according to claim 1, wherein said at least one plastic flange module extends along one side of said modular plastic air distributor module and in parallel with it, and at least one of said plurality of one piece plastic intake manifold modules is connected to an area of said modular plastic air distributor module that faces away from this side.

* * * * *

UNITED STATES PATENT AND TRADEMARK OFFICE
Certificate

Patent No. 6,581,561 B1

Patented: June 24, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kay Brodesser, Rutesheim (DE); Hans-Peter Drespling, Heidenheim (DE); Hans Jensen, Kirchheim (DE); G[00fc]nter Kachler, Ingersheim (DE); Horst Schneider, Waiblingen (DE); Jürgen Stehlig, Neckartailfingen (DE); Joachim Kelm, Pforzheim (DE); and Frank Dieterle, Ditzingen (DE).

Signed and Sealed this Twenty-fourth Day of July 2007.

STEPHEN K. CRONIN
*Supervisory Patent Examiner*
Art Unit 3747